(12) United States Patent
Nomura

(10) Patent No.: US 9,854,441 B2
(45) Date of Patent: Dec. 26, 2017

(54) TERMINAL APPARATUS CARRYING OUT COMMUNICATIONS AFTER AUTHENTICATION, A COMMUNICATION SYSTEM, AND A COMMUNICATION METHOD

(71) Applicant: JVC KENWOOD Corporation, Yokohama-shi (JP)

(72) Inventor: Kazuo Nomura, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 0 days.

(21) Appl. No.: 14/808,643

(22) Filed: Jul. 24, 2015

(65) Prior Publication Data

US 2016/0037342 A1    Feb. 4, 2016

(30) Foreign Application Priority Data

Jul. 30, 2014    (JP) .................... 2014-154717

(51) Int. Cl.
| | |
|---|---|
| *H04W 12/06* | (2009.01) |
| *H04W 4/02* | (2009.01) |
| *H04L 29/06* | (2006.01) |
| *H04W 88/06* | (2009.01) |

(52) U.S. Cl.
CPC ........... *H04W 12/06* (2013.01); *H04L 63/107* (2013.01); *H04L 63/18* (2013.01); *H04W 4/02* (2013.01); *H04W 88/06* (2013.01)

(58) Field of Classification Search
CPC ....... H04W 12/06; H04W 4/02; H04W 88/06; H04L 63/107; H04L 63/18
See application file for complete search history.

(56) References Cited

U.S. PATENT DOCUMENTS

| | | | | |
|---|---|---|---|---|
| 2007/0223516 A1* | 9/2007 | Dunn | ................... | H04W 48/18 370/462 |
| 2010/0022243 A1* | 1/2010 | Oommen | .............. | H04W 48/18 455/435.3 |
| 2011/0310787 A1* | 12/2011 | Sheriff | .................. | H04L 67/141 370/315 |

(Continued)

FOREIGN PATENT DOCUMENTS

| | | |
|---|---|---|
| JP | 2009-182380 A | 8/2009 |
| JP | 2012-103784 A | 5/2012 |
| JP | 2012-123487 A | 6/2012 |

*Primary Examiner* — Olumide T Ajibade Akonai
*Assistant Examiner* — Eboni Hughes
(74) *Attorney, Agent, or Firm* — Venable LLP; Michael A. Sartori; Miguel A. Lopez

(57) ABSTRACT

An acquiring unit acquires the positional information. A first request unit requests an authentication station to perform authentication by using the positional information acquired by the acquiring unit. When the authentication station grants authentication for a request from the first request unit, a communication processing unit carries out communications using a first radio communication system. When authentication required for carrying out the communications using the first radio communication system is not performed in the communication processing unit, a second request unit requests another terminal apparatus to perform authentication by using a second radio communication system, whose transmission distance is shorter than the first radio communication system.

6 Claims, 15 Drawing Sheets

(56) References Cited

U.S. PATENT DOCUMENTS

| | | | |
|---|---|---|---|
| 2013/0072180 A1* | 3/2013 | Uchiyama | H04W 24/00 455/422.1 |
| 2014/0105007 A1* | 4/2014 | Pathmasuntharam | H04L 12/2856 370/230 |
| 2014/0228000 A1* | 8/2014 | Nagatoshi | H04W 12/08 455/411 |
| 2015/0245268 A1* | 8/2015 | Williams | H04W 36/08 370/331 |

* cited by examiner

TERMINAL APPARATUS CARRYING OUT COMMUNICATIONS AFTER AUTHENTICATION, A COMMUNICATION SYSTEM, AND A COMMUNICATION METHOD

CROSS-REFERENCE TO RELATED APPLICATION

This application is based upon and claims the benefit of priority from the prior Japanese Patent Application No. 2014-154717, filed on Jul. 30, 2014, the entire contents of which are incorporated herein by reference.

BACKGROUND

1. Field of the Invention

The present invention relates to a communication technology, and it particularly relates to a terminal apparatus carrying out communications after authentication, a communication system, and a communication method.

2. Description of the Related Art

User authentication is carried out for the purpose of ensuring the security of a network. For example, when it is verified that a user is located within a predetermined distance, based on user authentication information for each user and the GPS (Global Positioning System) information indicating the location of a user, this user is authenticated (see Reference (1) in the following Related Art List, for instance).

RELATED ART LIST (1) Japanese Unexamined Patent Application Publication 2012-123487.

The security improves when only terminal apparatuses located within a predetermined rage are authenticated. However, every terminal apparatus has to move within the predetermined range in order to be authenticated and this is inconvenient for users.

SUMMARY

In order to resolve the foregoing problems, a terminal apparatus according to one embodiment includes: an acquiring unit that acquires positional information; a first request unit that requests an authentication station to perform authentication by using the positional information acquired by the acquiring unit; a communication unit that carries out communication using a first radio communication system, when a request from the first request unit has been authenticated by the authentication station; and a second request unit that requests another terminal apparatus to perform authentication by using a second radio communication system, whose transmission distance is shorter than the first radio communication system, when authentication required for carrying out the communication using the first radio communication system is not performed in the communication unit.

Another embodiment relates to a communication system. The communication system includes: a first terminal apparatus that requests authentication using acquired positional information; an authentication station that permits the first terminal apparatus to carry out communication using a first radio communication system, in response to a request sent from the first terminal apparatus, when the first terminal apparatus has been authenticated based on the positional information; and a second terminal apparatus for which the communication using the first radio communication system is not authenticated. The second terminal apparatus requests the first terminal apparatus to perform authentication by using a second radio communication system, whose transmission distance is shorter than the first radio communication system.

Still another embodiment relates to a communication method. The communication method includes: acquiring positional information; requesting an authentication station to perform authentication by using the positional information; carrying out communication using a first radio communication system, when an authentication request has been authenticated by the authentication station; and requesting another terminal apparatus to perform authentication by using a second radio communication system, whose transmission distance is shorter than the first radio communication system, when authentication required for carrying out the communication using the first radio communication system is not performed.

Still another embodiment relates also to a communication method. The communication method includes: requesting, by a first terminal apparatus, authentication by using positional information acquired; permitting, by an authentication station, the first terminal apparatus to carry out communication using a first radio communication system, in response to a request sent from the first terminal apparatus, when the first terminal apparatus has been authenticated based on the positional information; and requesting, by a second terminal apparatus, the first terminal apparatus to perform authentication by using a second radio communication system, whose transmission distance is shorter than the first radio communication system, when authentication required for carrying out the communication using the first radio communication system is not performed.

Optional combinations of the aforementioned constituting elements, and implementations of the invention in the form of methods, apparatuses, systems, recording media, computer programs and so forth may also be practiced as additional modes.

BRIEF DESCRIPTION OF THE DRAWINGS

Embodiments will now be described by way of examples only, with reference to the accompanying drawings, which are meant to be exemplary, not limiting and wherein like elements are numbered alike in several Figures in which.

DETAILED DESCRIPTION

Figure 1:
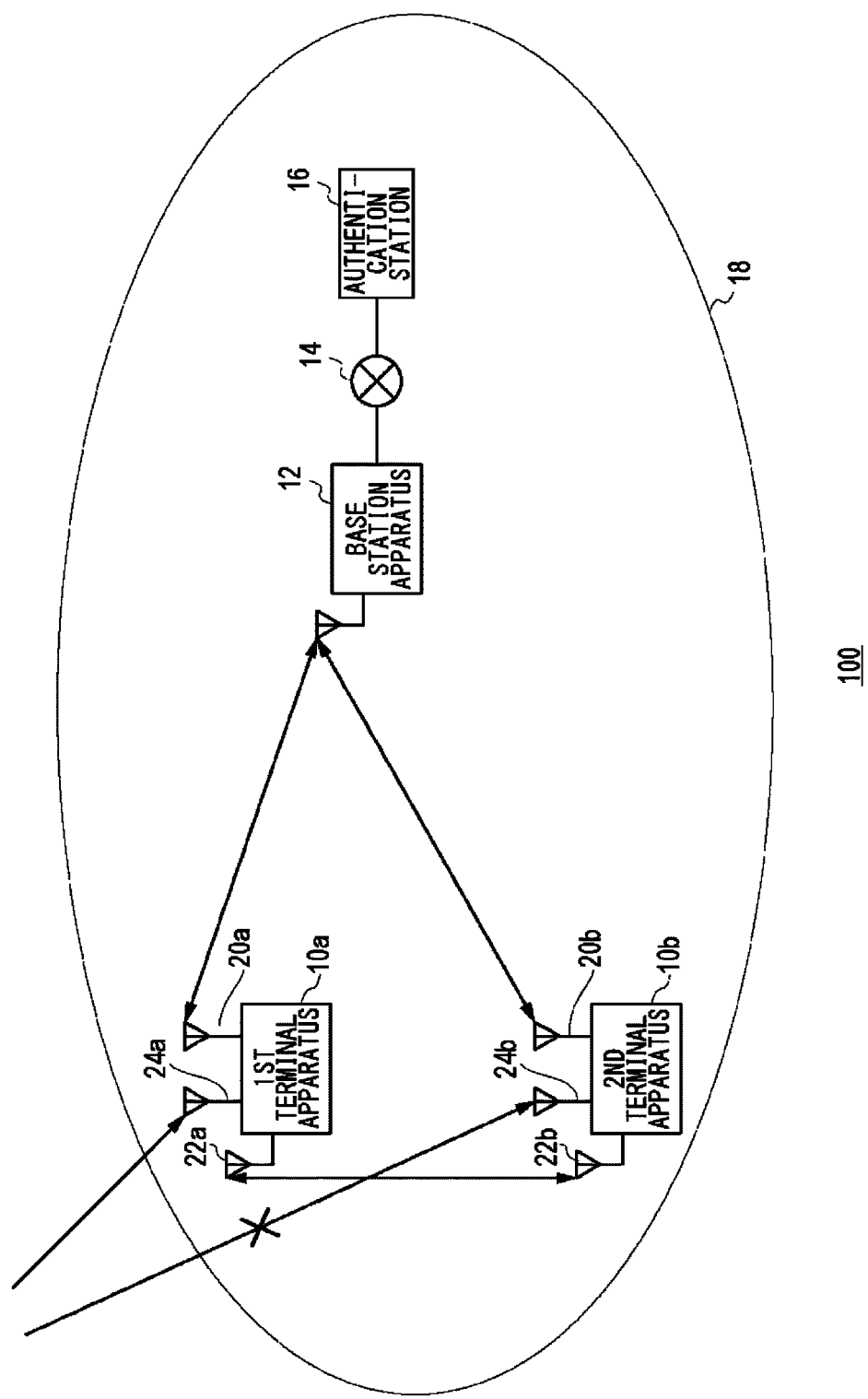
FIG. 1 shows a structure of a communication system according to a first exemplary embodiment.

The invention will now be described by reference to the preferred embodiments. This does not intend to limit the scope, but to exemplify the invention.

First Exemplary Embodiment

The present invention will be outlined before it is explained in detail. A first exemplary embodiment relates to a communication system including a plurality of base station apparatuses connected to a network, a plurality of terminal apparatuses connected to each of the plurality of base station apparatuses, and an authentication station connected to the network. An example of the communication system is a wireless system for business or commercial use (hereinafter referred to as "business-use wireless system" also). In the business-use wireless system, a group is formed by a plurality of terminal apparatuses. A base station apparatus allots an uplink channel and an uplink channel to a group. Under such circumstances, one terminal apparatus (hereinafter referred to as a "transmitter") in the group transmits a signal through the uplink channel, and another terminal apparatus (hereinafter referred to as a "receiver") in the group receives the signal through the downlink. A base station apparatus, which differs from the base station apparatus to which the transmitter is connected, is also allotted a downlink channel for this group. Thus a receiver connected to this different base station apparatus can also receive the signal. Further, the similar processing is carried out to another group but no communication is carried out between different groups.

In order to ensure the security of the communication, authentication for terminal apparatuses used is required. For example, a terminal apparatus acquires its own positional information before the communication is started, and transmits an authentication request while the positional information is being attached to the authentication request. If the authentication request reaches the authentication station by way of a base station and then the positional information lies within a predetermined area, the authentication station authenticates this terminal apparatus (namely, grants authentication for this terminal apparatus). Once the terminal apparatus is authenticated, the terminal apparatus participates in a group and carries out communications. The authentication is granted only when the terminal apparatus is located within the area. Thus a terminal apparatus located in an unexpected position fails to be authenticated, thereby improving the security. If, on the other hand, the terminal apparatus is located in a position where the positional information cannot be acquired, authentication cannot be granted. In this case, the communication cannot be carried out, thereby reducing user convenience.

In order to cope with this, the terminal apparatuses according to the present embodiment are compatible with a short-range communication system that is different from the business-use communication system. In contrast to the short-range communication system, the business-use wireless system is said to be a long-distance communication system. A terminal apparatus, which has failed to acquire the positional information, broadcasts an authentication request using the short-range communication system, instead of transmitting the authentication request to the authentication station. If another terminal apparatus, which has received this authentication request, has already been authenticated by the authentication station, the other terminal apparatus acts on behalf of the authentication station (namely, the other terminal apparatus is used in substitution for the authentication station) and grants the authentication request. As a result, the terminal apparatus, which had failed to acquire the positional information, also participates in the group and communicates with other terminal apparatuses and so forth in the group.

FIG. 1 shows a structure of a communication system 100 according to a first exemplary embodiment. The communication system 100 includes a first terminal apparatus 10a and a second terminal apparatus 10b, which are generically referred to as "terminal apparatus 10" or "terminal apparatuses 10", a base station apparatus 12, a network 14, and an authentication station 16. The first terminal apparatus 10a includes a first antenna 20a for use with long-distance communications (hereinafter referred to as a "first long-distance communication antenna 20a"), a first antenna 22a for use with short-range communications (hereinafter referred to as a "first short-range communication antenna 22a"), and a first antenna 24a for use with GPS (global positioning system) (hereinafter referred to as a "first GPS antenna 24a"). Similarly, the second terminal apparatus 10b includes a second long-distance communication antenna 20b, a second short-range communication antenna 22b, and a second GPS antenna 24b. Here, the first long-distance communication antenna 20a and the second long-distance communication antenna 20b are generically referred to as "long-distance communication antenna 20" or "long-distance communication antennas 20". Also, the first short-range communication antenna 22a and the second short-range communication antenna 22b are generically referred to as "short-range communication antenna 22" or "short-range communication antennas 22". Also, the first GPS antenna 24a and the second GPS antenna 24b are generically referred to as "GPS antenna 24" or "GPS antennas 24". An area 18 is formed around the base station apparatus 12.

The base station apparatus 12 can set a plurality of channels, and allocates each channel to a group. Known art may be used for channels. Here, for example, a plurality of channels are multiplexed by TDMA (Time-Division Multiple Access)/FDD (Frequency-Division Duplexing). For example, the base station apparatus 12 can set channel 1 (Ch1) and channel 3 (Ch3) to channel 6 (Ch6) as downlink channels and can set channel 2 (Ch2) and channel 7 (Ch7) to channel 10 (Ch10) as uplink channels. Here, Ch1 is used for a downlink control channel, and Ch2 is used for an uplink control channel. Also, Ch3 and Ch7 are allocated to the same group as a single combination. The same is applied to Ch4 to Ch6 as well as Ch8 to Ch10.

The base station apparatus 12 is connected to not-shown other terminal apparatuses 10 via the network 14. Although other base station apparatuses 12 set the channels similarly, the number of channels that can be set may differ for each base station apparatus 12 or those channels may be commonly used. Assume herein that Ch1 and Ch2 are commonly used for all base station apparatuses 12 as the downlink control channel and the uplink control channel, respectively. Also, a plurality of frequency channels may be used for each of the downlink channel and the uplink channel.

A terminal apparatus 10 is a radio terminal that can communicate with other terminal apparatuses (not shown) via the base station apparatus 12. Assume herein that the communications mean voice communications (telephone calls) between terminal apparatuses 10. Note that data communications may be carried out. When the terminal apparatus 10 moves toward and then approaches the base station apparatus 12, the terminal apparatus 10 requests the base station apparatus 12 to register the position of the terminal apparatus 10. At this time, the registration of a group to be used is also required. These requests are contained in the uplink control channel of Ch2 and are transmitted in a random access. The base station apparatus 12 registers terminal apparatuses 10 for each group in response to the request.

When a call is placed by a terminal apparatus 10, the terminal apparatus 10 transmits an uplink control channel signal containing the call originating request, through Ch2. The base station apparatus 12, which has received the uplink control channel signal, regards this terminal apparatus 12 as a transmitter and allocates a channel to the group to which the transmitter belongs. Here, the channel or channels is/are generic or collective terms for downlink channels and uplink channels. The base station apparatus 12 requests the other base station apparatuses 12 to allocate a channel to the group, via the network 14. The other base station apparatuses 12 verify whether or not the group is registered, in response to the request. If the group is registered, the other base station apparatuses 12 assigns a channel to the group.

The base station apparatus 12 and the other base station apparatuses 12 transmit the downlink control channel signal, which contain the information on the allocated channel, to the terminal apparatus 10. The receiver and the transmitter, which are the rest of the terminal apparatuses 10 included in the group, receive the downlink control channel signal so as to recognize the allocated channel. The transmitter transmits the signal to the base station apparatus 12 through the allocated uplink channel. This signal contains a digitized audio signal. If the receiver is included in the group to which the transmitter belongs, the base station apparatus 12 transmits the signal to the receiver through the allocated downlink channel. Also, the base station apparatus 12 transmits the received signal to the other base station apparatuses 12. The other base station apparatuses 12 transmit the signal to the receiver through the allocated channel. The receiver reproduces the audio signal based on the received signal and then outputs the reproduced audio signal from a speaker.

In this manner, a plurality of groups each including a plurality of terminal apparatuses 10 are formed. Also, a plurality of base station apparatuses 12 each allocates a channel to each group. As a result, one terminal apparatus 10 included in a group, to which the channel has been allocated, communicates with the rest of the terminal apparatuses 10 belonging to this same group.

Among a plurality of terminal apparatuses 10 belonging to the same group, the transmitter and the receiver may exchange their functions (namely, the transmitter may function as the receiver, and the receiver may function as the transmitter). If a signal to be transmitted is generated in a terminal apparatus 10 that has operated as the receiver, this terminal apparatus 10 transmits the uplink control channel signal containing the call originating request, as described above. Thereby, this terminal apparatus 10, which has operated as the receiver so far, now switches its function to a transmitter. Also, the terminal apparatus 10, which operates as the transmitter, now switches its function back to the receiver when the transmission of the signal has been completed. When a call is generated, such a group call uses a single combination of channels of each base station apparatus 12. Thus, if the terminal apparatus 10 included in the same group is registered in a plurality of base station apparatuses 12, one call uses channels the number of which is equal to the number of the plurality of base station apparatuses 12. The above-described processing is carried out for each group.

Prior to such a communication processing, an authentication processing may be performed between the terminal apparatus 10 and the authentication station 16. The authentication processing may be carried out by the base station apparatus 12, instead of by the authentication station 16. The first terminal apparatus 10a acquires information on a position, where the first terminal apparatus 10a is located (hereinafter this information will be referred to as "positional information"), by receiving signals sent from not-shown GPS satellites via the first GPS antenna 24a. The first terminal apparatus 10a generates an authentication request signal containing the positional information and transmits the authentication request to the base station apparatus 12 from the first long-distance communication antenna 20a. Specifically, the first terminal apparatus 10a requests authentication by using the acquired positional information.

The authentication station 16 is connected to the base station apparatus 12 via the network 14 and receives the authentication request sent from the terminal apparatus 10. The authentication station 16 performs authentication processing on the first terminal apparatus 10a, based on the positional information, in response to the authentication request sent from the first terminal apparatus 10a. The authentication station 16 specifies beforehand the area 18 that can be validated. If the positional information contained in the authentication request is within the area 18, the authentication station 16 authenticates the first terminal apparatus 10a. If, on the other hand, the positional information is not within the area 18, the authentication is not granted for the first terminal apparatus 10a. FIG. 1 corresponds to the former case where the authentication is granted for the first terminal apparatus 10a. If the authentication is granted, the authentication station 16 transmits an authentication response signal indicating that the authentication has been granted, to the first terminal apparatus 10a via the network 14 and the base station apparatus 12. This corresponds to permitting the first terminal apparatus 10a to communicate using the long-distance communication system. An uplink control channel is used for the transmission of the authentication request, whereas a downlink control channel is used for the transmission of the authentication response.

The second terminal apparatus 10b is configured similarly to the first terminal apparatus 10a. However, the second terminal apparatus 10b cannot receive signals sent from the GPS satellites via the second GPS antenna 24b and therefore cannot acquire the positional information. For this reason, the second terminal apparatus 10b cannot transmit an authentication request containing the positional information, to the authentication station 16. Thus, the authentication required for the communication using the long-distance communication system is not granted for the second terminal apparatus 10b. On the other hand, the second terminal apparatus 10b broadcasts the authentication request via the second short-range communication antenna 22b. The authentication request broadcast by the second terminal apparatus 10b does not contain the positional information. This corresponds to requesting other terminal apparatuses 10 to perform authentication by using the short-range communication system, whose transmission distance is shorter than the long-distance communication system.

In the case of FIG. 1, the first terminal apparatus 10a receives the authentication request from the second terminal apparatus 10b via the first short-range communication antenna 22a. Since the first terminal apparatus 10a has been authenticated by the authentication station 16, the first terminal apparatus 10a acts on behalf of the authentication station 16 and performs authentication processing on the second terminal apparatus 10b. Assume herein that the first terminal apparatus 10a authenticates the second terminal apparatus 10b. If the authentication is granted, the first terminal apparatus 10a transmits an authentication response signal indicating the approval of the authentication, to the second terminal apparatus 10b via the first short-range communication antenna 22a. This corresponds to permitting the second terminal apparatus 10b to communicate using the long-distance communication system.

Figure 2:
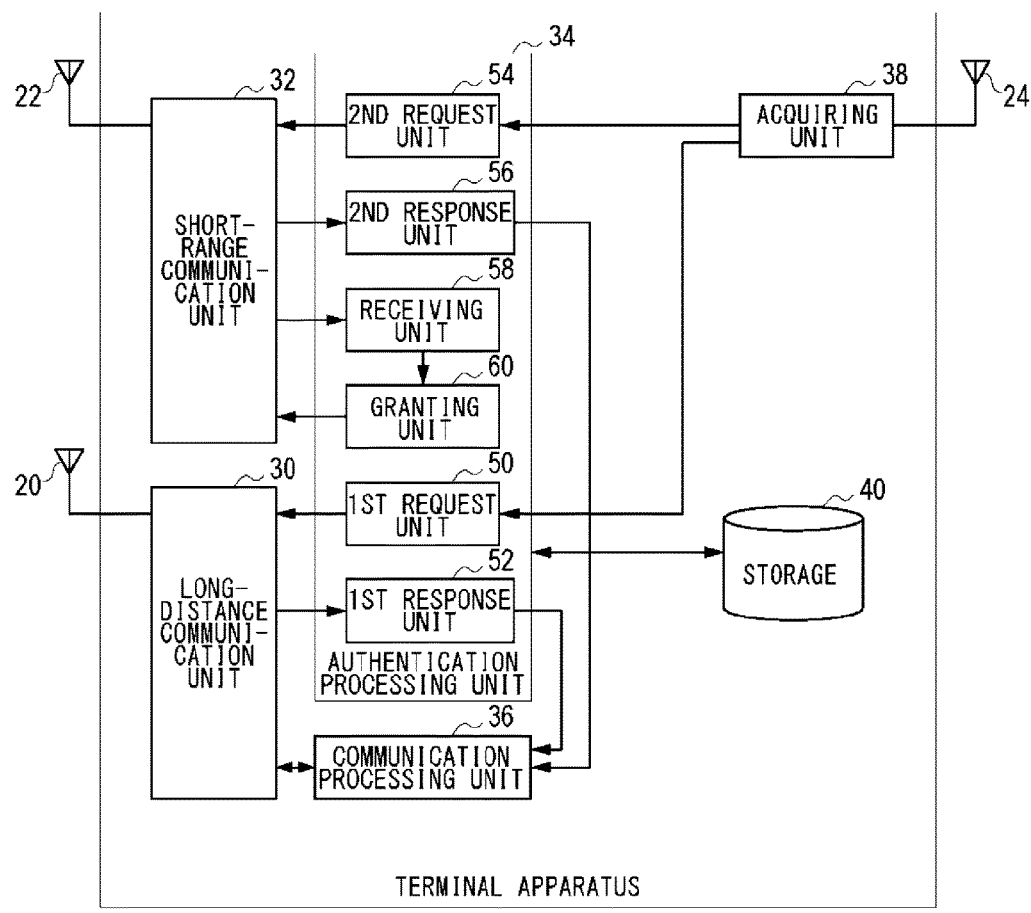
FIG. 2 shows a structure of a terminal apparatus shown in FIG. 1.

FIG. 2 shows a structure of a terminal apparatus 10. The terminal apparatus 10 includes a long-distance communication antenna 20, a short-range communication antenna 22, a GPS antenna 24, a long-distance communication unit 30, a short-range communication unit 32, an authentication processing unit 34, a communication processing unit 36, an acquiring unit 38, and a storage 40. The authentication processing unit 34 includes a first request unit 50, a first response unit 52, a second request unit 54, a second response unit 56, a receiving unit 58, and a granting unit 60.

The acquiring unit 38 receives signals from not-shown GPS satellites via the GPS antenna 24. The acquiring unit 38 acquires positional information, based on the received signals. Known art may be used for the acquisition of the positional information and therefore the description thereof is omitted here. If the positional information has been acquired, the acquiring unit 38 outputs the positional information to the first request unit 50. If, on the other hand, the acquisition of the positional information has failed, the acquiring unit 38 outputs the fact about the failure to the second request unit 54.

If the positional information has been acquired by the acquiring unit 38, the first request unit 50 receives the positional information fed from the acquiring unit 38. The first request unit 50 generates an authentication request so that the positional information acquired by the acquiring unit 38 can be contained in the authentication request. The request signal is a signal with which to request the authentication station 16 to perform authentication. The first request unit 50 outputs the authentication request to the long-distance communication unit 30.

The long-distance communication unit 30 carries out a communication processing corresponding to the aforementioned business-use wireless system. As described above, for clarification by comparison with the short-range communication system, there may be cases where the business-use wireless system is here called a long-distance communication system. The long-distance communication unit 30 receives the authentication request fed from the first request unit 50 and then transmits the authentication request to the base station apparatus 12 via the long-distance communication antenna 20. The base station apparatus 12 outputs the received authentication request to the authentication station 16 where the authentication processing is performed as described above. If the positional information is within the area 18, the authentication station 16 authenticates the terminal apparatus 10 and transmits an authentication response corresponding to the authentication of the terminal apparatus 10.

The first response unit 52 receives the authentication response from the authentication station 16 and the base station apparatus 12 via the long-distance communication unit 30. If the authentication response indicates that the authentication is granted, the first response unit 52 instructs the communication processing unit 36 to carry out communications. If the authentication response indicates that the authentication is not granted, the first response unit 52 terminates the processing. The storage 40 stores the result of the authentication. If instructions are received from the first response unit 52, the communication processing unit 36 carries out communications using the long-distance communication system, via the long-distance communication unit 30. The communication carried out here is assumed to be a group call.

If acquiring the positional information by the acquiring unit 38 has failed, the second request unit 54 is notified of the failure from the acquiring unit 38. This corresponds to the case where the authentication required for the communication using the long-distance communication system is not granted in the communication processing unit 36. The second request unit 54 generates an authentication request. This authentication request does not contain the positional information. The second request unit 54 outputs the authentication request to the short-range communication unit 32.

The short-range communication unit 32 carries out a communication processing corresponding to the short-range communication system. An example of the short-range communication system is Bluetooth (registered trademark). The short-range communication unit 32 receives an authentication request fed from the second request unit 54 and broadcasts the authentication request from the short-range communication antenna 22. This corresponds to requesting other terminal apparatuses 10 to perform authentication by using the short-range communication system, whose transmission distance is shorter than the long-distance communication system. The processing carried out by other terminal apparatuses will be discussed later.

The second response unit 56 receives an authentication response fed from another terminal apparatus 10, via the short-range communication unit 32. If the authentication response indicates that the authentication is granted, the second response unit 56 instructs the communication processing unit 36 to carry out communications. If the authentication response indicates that the authentication is not granted, the second response unit 56 terminates the processing. If instructions fed from the second response unit 56 are received, the communication processing unit 36 carries out communications using the long-distance communication system, via the long-distance communication unit 30. The communication carried out here is assumed to be a group call.

The authentication request sent from this terminal apparatus 10 is receive by the other terminal apparatus 10. The receiving unit 58 and the granting unit 60 in the other terminal apparatus 10 carry out the following processings. The receiving unit 58 receives the authentication request sent from the terminal apparatus 10, via the short-range communication unit 32. As the receiving unit 58 receives the authentication request, the granting unit 60 references the storage 40 and thereby verifies whether or not authentication has already been granted by the authentication station 16. If the authentication is granted, the granting unit 60, which now acts on behalf of the authentication station 16, authenticates the terminal apparatus 10. If the authentication is not done, the granting unit 60 does not grant authentication. The granting unit 60 generates an authentication response containing the authentication result, and transmits the authentication response to the terminal apparatus 10 via the short-range communication unit 32.

These structural components may be implemented hardwarewise by elements such as a CPU, memory and other LSIs of an arbitrary computer, and softwarewise by memory-loaded programs or the like. Depicted herein are functional blocks implemented by cooperation of hardware and software. Therefore, it will be obvious to those skilled in the art that the functional blocks may be implemented by a variety of manners including hardware only, software only or a combination of both.

Figure 3:
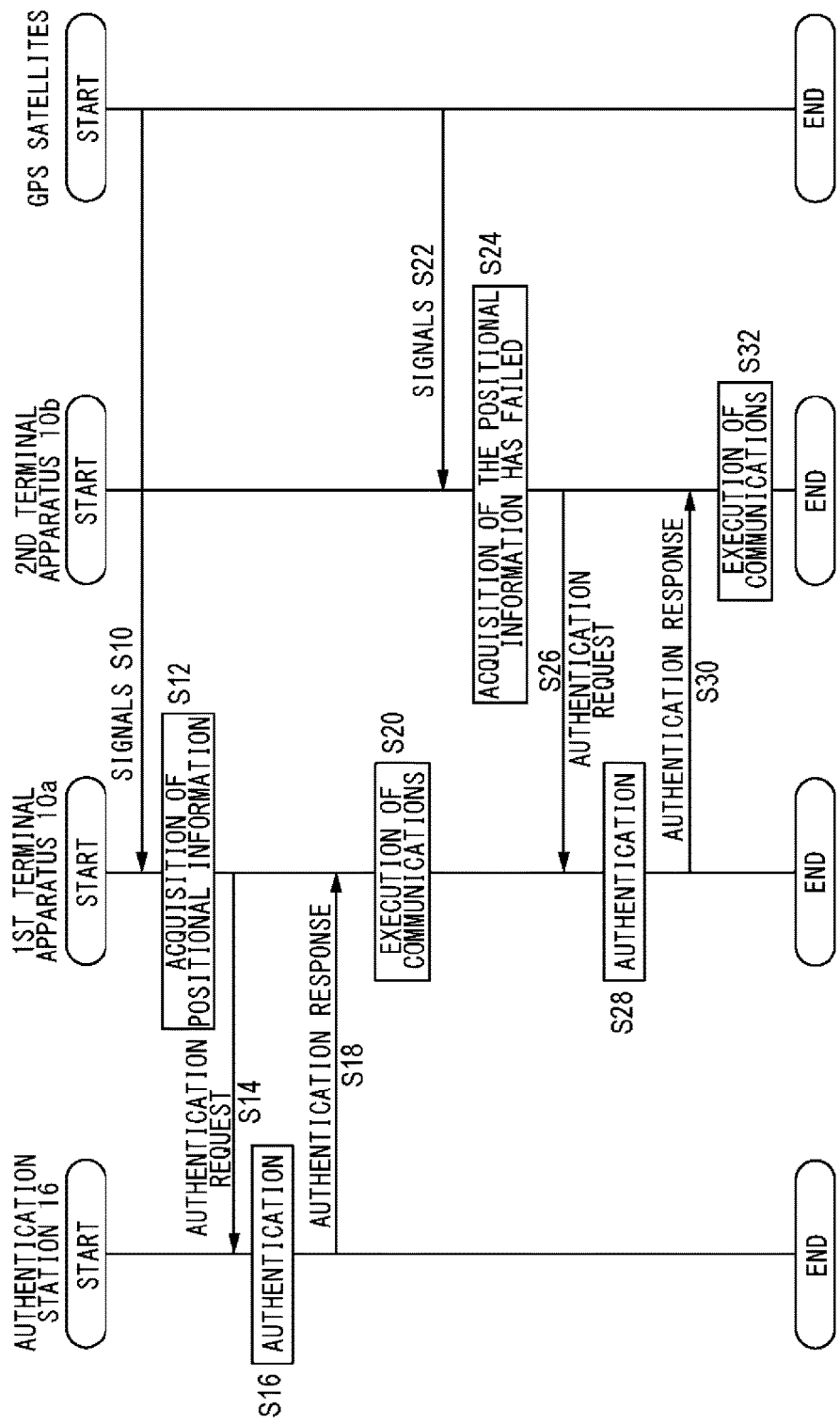
FIG. 3 is a sequence diagram showing a communication procedure carried out by the communication system of FIG. 1.

Operations of the communication system 100 configured as above are now explained. FIG. 3 is a sequence diagram showing a communication procedure carried out by the communication system 100. The signals sent from the GPS satellites are received by the first terminal apparatus 10a (S10). The first terminal apparatus 10a acquires positional information (S12). The first terminal apparatus 10a transmits an authentication request, which contains the positional information, to the authentication station 16 (S14). The authentication station 16 performs authentication (S16). The authentication station 16 transmits an authentication response indicating that the authentication is successful, to the first terminal apparatus 10a (S18). The first terminal apparatus 10a carries out communications (S20). The signals sent from the GPS satellites are not received by the second terminal apparatus 10b (S22). The second terminal apparatus 10b fails to acquire the positional information (S24). The second terminal apparatus 10b transmits an authentication request to the first terminal apparatus 10a (S26). The first terminal apparatus 10a performs authentication (S28). The first terminal apparatus 10a transmits an authentication response indicating that the authentication is successful, to the second terminal apparatus 10b (S30). The second terminal apparatus 10b carries out communications (S32).

Figure 4:
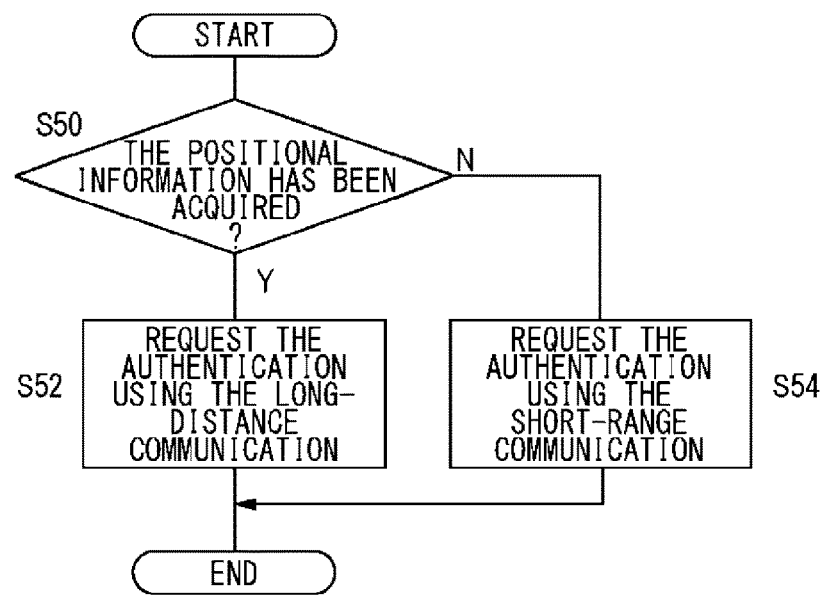
FIG. 4 is a flowchart showing an authentication request procedure carried out by the terminal apparatus of FIG. 2.

FIG. 4 is a flowchart showing an authentication request procedure carried out by the terminal apparatus 10. If the acquiring unit 38 has acquired the positional information (Y of S50), the first request unit 50 transmits an authentication request using the long-distance communication (S52). If the acquiring unit 38 does not acquire the positional information (N of S50), the second request unit 54 transmits an authentication request using the short-range communication (S54).

Figure 5:
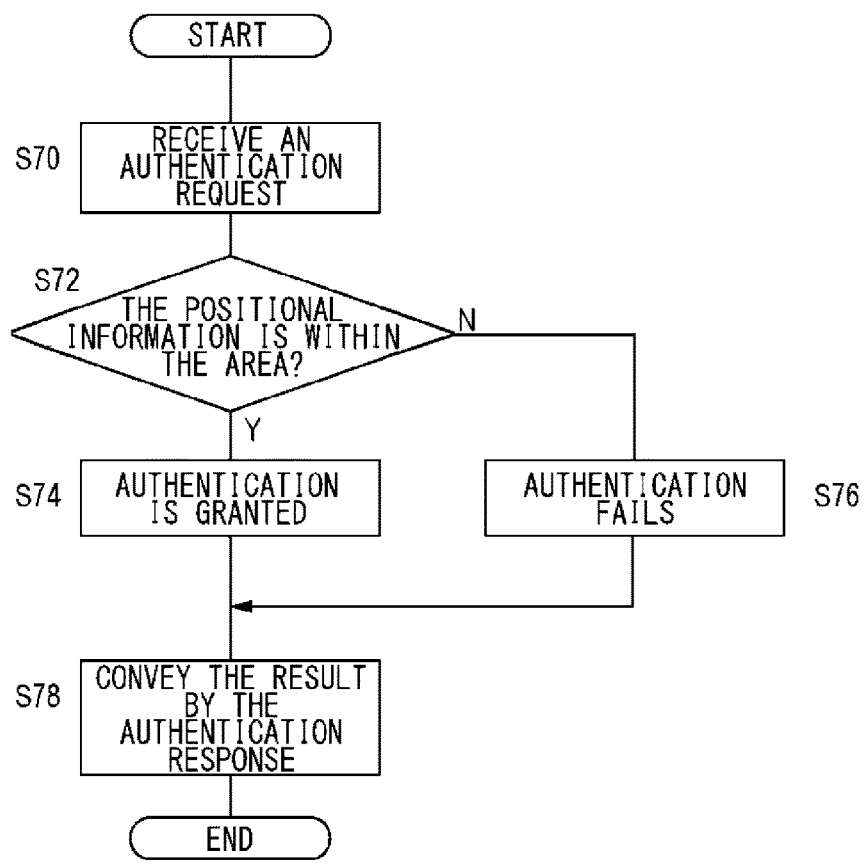
FIG. 5 is a flowchart showing an authentication response procedure carried out by the authentication station of FIG. 1.

FIG. 5 is a flowchart showing an authentication response procedure carried out by the authentication station 16. The authentication request is received (S70). If the positional information is within the area (Y of S72), the authentication proves successful (S74). If the positional information is not within the area (N of S72), the authentication is unsuccessful (S76). The authentication station 16 conveys the authentication result by an authentication response (S78).

Figure 6:
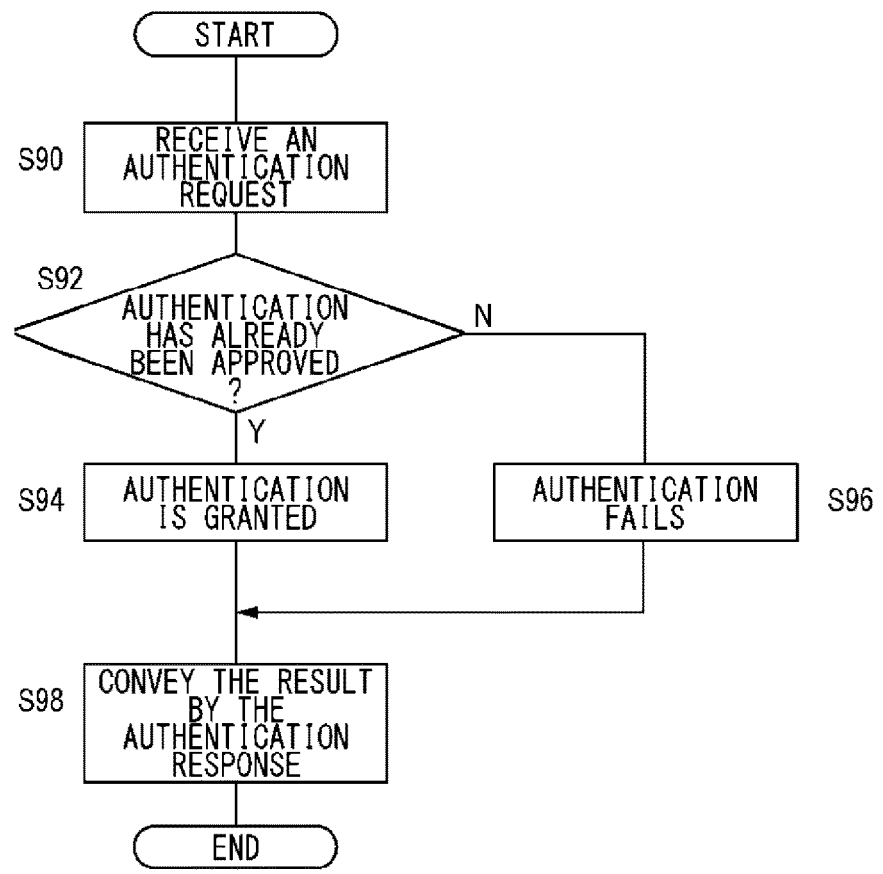
FIG. 6 is a flowchart showing an authentication response procedure by the terminal apparatus of FIG. 2.

FIG. 6 is a flowchart showing an authentication response procedure carried out by the terminal apparatus 10. The receiving unit 58 receives an authentication request (S90). If the authentication has already been approved (Y of S92), the granting unit 60 grants authentication (S94). If the authentication has not been approved (N of S92), the granting unit 60 does not grant authentication (S96). The granting unit 60 conveys the authentication result by an authentication response (S98).

Figure 7:
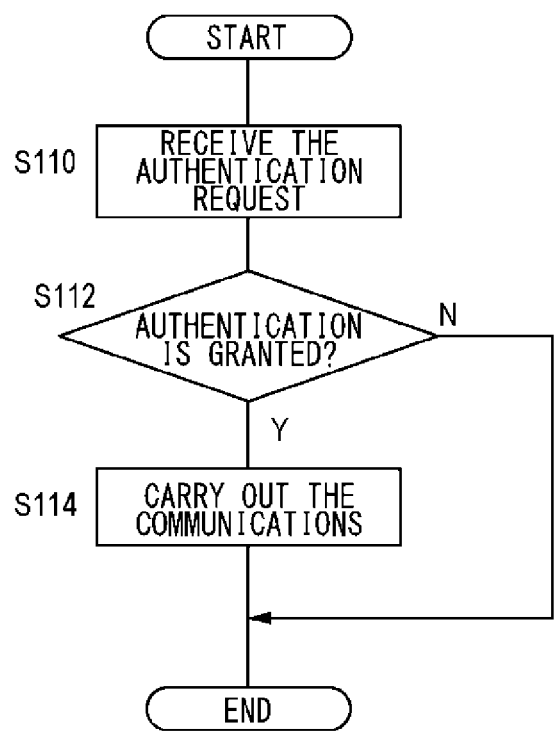
FIG. 7 is a flowchart showing a communication procedure carried out by the terminal apparatus of FIG. 2.

FIG. 7 is a flowchart showing a communication procedure carried out by the terminal apparatus 10. The first response unit 52 or the second response unit 56 receives the authentication response (S110). If the authentication is granted (Y of S112), the communication processing unit 36 carries out communications (S114). If the authentication is not granted (N of S112), the processing is terminated.

By employing the first exemplary embodiment, when a terminal apparatus does not acquire the positional information, this terminal apparatus asks another terminal apparatus, which has already been authenticated, to perform authentication, so that the user's convenience can be enhanced while the security is being ensured. Also, the short-range communication system is used when this terminal requests the other terminal apparatus to perform authentication, so that the authentication can be done if these two terminal apparatuses are located close to each other. Also, since the authentication is executed if these terminal apparatuses are located close to each other, the security can be enhanced. Also, since the authentication request using the short-range system is not transmitted if the positional information has been acquired, an increase in the traffic can be suppressed. Also, since the terminal apparatus, which has already been authenticated by the authentication station, acts on behalf of the authentication station and performs authentication, the reliability of authentication can be kept intact.

Second Exemplary Embodiment

A description is now given of a second exemplary embodiment. Similar to the first exemplary embodiment, the second exemplary embodiment relates also to a communication system in which authentication is performed based on the positional information. In the first exemplary embodiment, the authentication is performed by the other terminal apparatus. On the other hand, the other terminal apparatus in the second exemplary embodiment does not perform authentication but, instead, carries out a processing to assist the authentication performed by the authentication station. A communication system 100 and a terminal apparatus 10 according to the second exemplary embodiment are of similar types to those shown in FIG. 1 and FIG. 2, respectively. A description is given herein centering around features different from the first exemplary embodiment.

The first terminal apparatus 10a of FIG. 1 requests authentication by using the acquired positional information. If the positional information contained in the authentication request is within the area 18, the authentication station 16 authenticates the first terminal apparatus 10a. If authentication is granted, the authentication station 16 transmits an authentication response signal indicating that the authentication has been granted, to the first terminal apparatus 10a via the network 14 and the base station apparatus 12. Here, the authentication station 16 has an authentication code contained in an authentication response. The authentication code is information with which to verify that authentication has been granted by the authentication station 16. Upon receiving the authentication response, the first terminal apparatus 10a stores the authentication code.

The second terminal apparatus 10b, which cannot acquire the positional information, now broadcasts an authentication request via the second short-range communication antenna 22b. The first terminal apparatus 10a receives the authentication request sent from the second terminal apparatus 10b, via the first short-range communication antenna 22a. The first terminal apparatus 10a, which has stored the authentication code sent from the authentication station 16, generates an authentication response containing the authentication code. The first terminal apparatus 10a transmits the authentication response to the second terminal apparatus 10b via the first short-range communication antenna 22a. Upon receiving the authentication response, the second terminal apparatus 10b extracts the authentication code from the authentication response.

The second terminal apparatus 10b generates an authentication request containing the authentication code and transmits the authentication request to the base station apparatus 12 from the second long-distance communication antenna 20b. In response to the authentication request sent from the second terminal apparatus 10b, the authentication station 16 performs authentication processing on the second terminal apparatus 10b, based on the authentication code. If the received authentication code is the same as the authentication code that has already been outputted, the authentication station authenticates the second terminal apparatus 10b. If, on the other hand, the received authentication code is not the same, the authentication is not granted for the second terminal apparatus 10b. If the authentication is granted, the authentication station 16 transmits an authentication response signal indicating that the authentication has been granted, to the second terminal apparatus 10b via the network 14 and the base station apparatus 12.

The first response unit 52 of FIG. 2 receives the authentication response from the authentication station 16 and the base station apparatus 12 via the long-distance communication unit 30. If the authentication response indicates that the authentication is granted, the first response unit 52 instructs the communication processing unit 36 to carry out communications. Also, the storage 40 stores the authentication code contained in the authentication response. If instructions fed from the first response unit 52 are received, the communication processing unit 36 carries out communications using the long-distance communication system, via the long-distance communication unit 30.

If the acquiring unit 38 has failed to acquire the positional information, the second request unit 54 generates an authentication request and outputs the authentication request to the short-range communication unit 32. The short-range communication unit 32 receives the authentication request fed from the second request unit 54 and then broadcasts the authentication request from the short-range communication antenna 22. A processing, carried out by another terminal apparatus 10, corresponding to this processing will be discussed later. The second response unit 56 receives an authentication response sent from the other terminal apparatus 10, via the short-range communication unit 32. The authentication response contains an authentication code. The storage 40 stores the authentication code. The first request unit 50 generates an authentication request so that, instead of the positional information, the authentication code stored in the storage 40 can be contained in the authentication request. The first request unit 50 outputs the authentication request to the long-distance communication unit 30. The long-distance communication unit 30 receives the authentication request fed from the first request unit 50 and then transmits the authentication request to the base station apparatus 12 via the long-distance communication antenna 20.

The base station apparatus 12 outputs the received authentication request to the authentication station 16, and the authentication station 16 performs authentication processing. If the authentication code contained in the authentication request is the same as the authentication code that has already been outputted, the authentication station 16 authenticates the terminal apparatus 10 and transmits an authentication response reflecting this result. The first response unit 52 receives the authentication request from the authentication station 16 and the base station apparatus 12 via the long-distance communication unit 30. If the authentication response indicates that the authentication is granted, the first response unit 52 instructs the communication processing unit 36 to carry out communications. If instructions fed from the first response unit 52 are received, the communication processing unit 36 carries out communications using the long-distance communication system, via the long-distance communication unit 30.

The authentication request sent from this terminal apparatus 10 is received by another terminal apparatus 10. The receiving unit 58 and the granting unit 60 in the other terminal apparatus 10 carries out the following processing. Here, the other terminal apparatus 10 has already been authenticated by the authentication station 16 and has received the authentication code sent from the authentication station 16. The receiving unit 58 receives the authentication request sent from the terminal apparatus 10, via the short-range communication unit 32. As the receiving unit 58 receives the authentication request, the granting unit 60 generates the authentication response, which contains the authentication code, stored in the storage 40 and then transmits the authentication response to the terminal apparatus 10 via the short-range communication unit 32.

Figure 8:
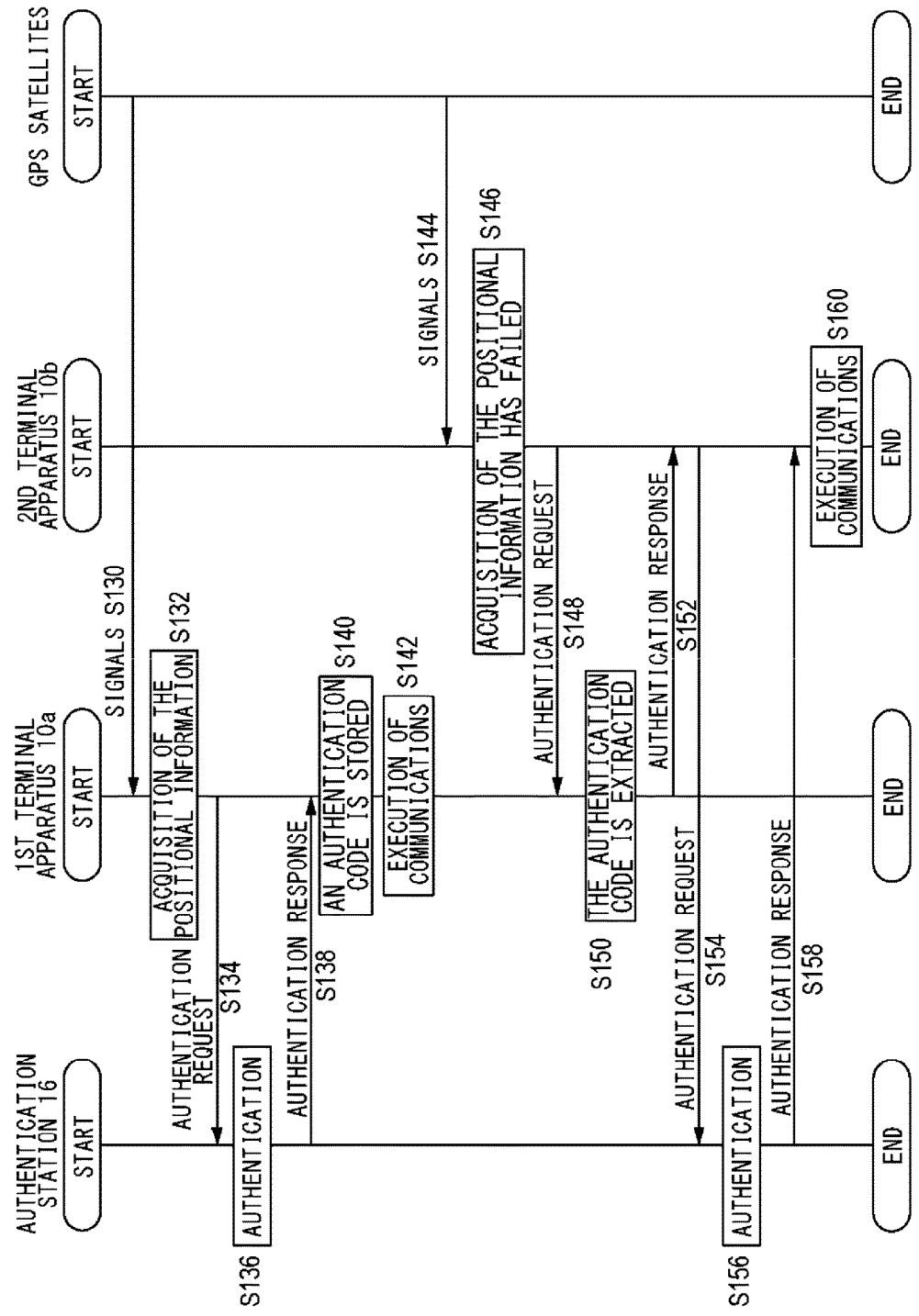
FIG. 8 is a sequence diagram showing a communication procedure carried out by a communication system according to a second exemplary embodiment.

FIG. 8 is a sequence diagram showing a communication procedure carried out by the communication system 100 according to the second exemplary embodiment. The signals sent from the GPS satellites are received by the first terminal apparatus 10a (S130). The first terminal apparatus 10a acquires positional information (S132). The first terminal apparatus 10a transmits an authentication request, which contains the positional information, to the authentication station 16 (S134). The authentication station 16 performs authentication (S136). The authentication station 16 transmits an authentication response, which indicates that the authentication is successful and which contains an authentication code, to the first terminal apparatus 10a (S138). The first terminal apparatus 10a stores the authentication code (S140) and carries out communications (S142). The signals sent from the GPS satellites are not received by the second terminal apparatus 10b (S144). The second terminal apparatus 10b fails to acquire the positional information (S146).

The second terminal apparatus 10b transmits an authentication request to the first terminal apparatus 10a (S148). The first terminal apparatus 10a extracts the authentication code (S150). The first terminal apparatus 10a transmits an authentication response containing the authentication code, to the second terminal apparatus 10b (S152). The second terminal apparatus 10b transmits an authentication request containing the authentication code, to the authentication station 16 (S154). The authentication station 16 performs authentication (S156). The authentication station 16 transmits an authentication response indicating that the authentication is successful, to the second terminal apparatus 10b (S158). The second terminal apparatus 10b carries out communications (S160).

Figure 9:
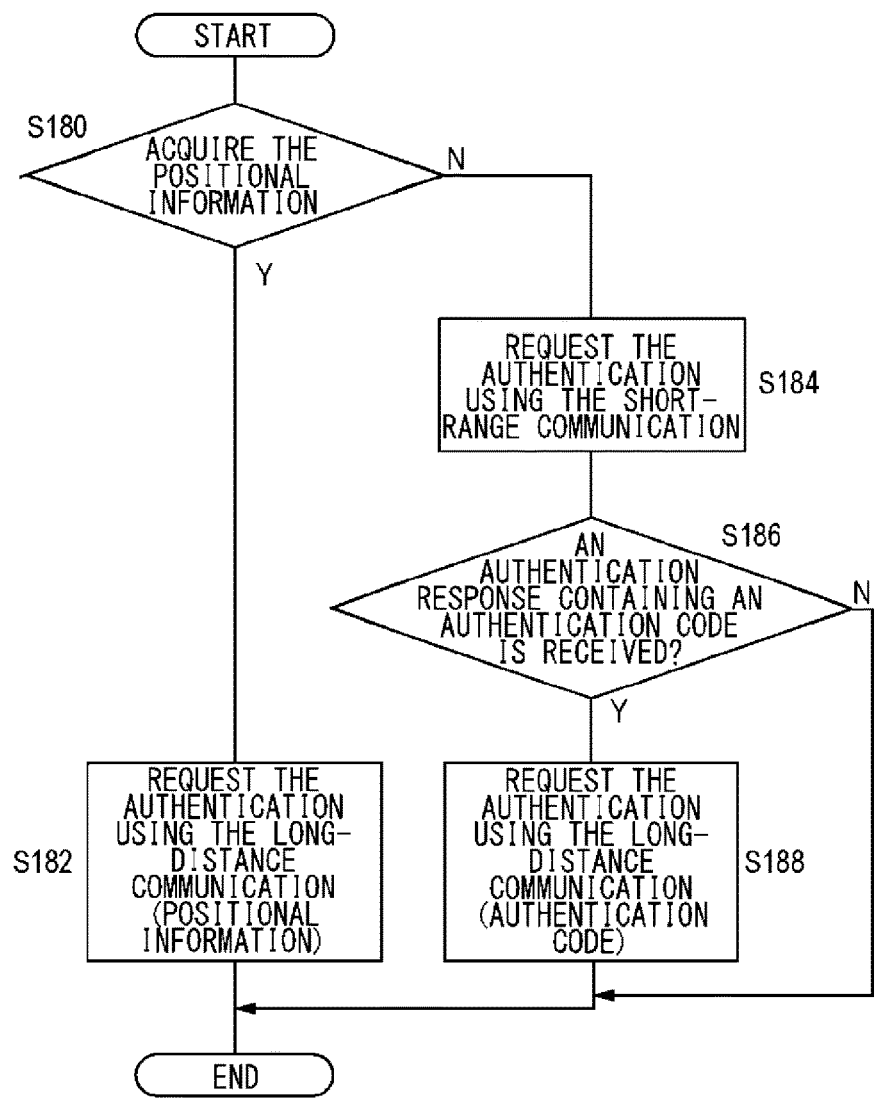
FIG. 9 is a flowchart showing an authentication request procedure carried out by a terminal apparatus according to a second exemplary embodiment.

FIG. 9 is a flowchart showing an authentication request procedure carried out by a terminal apparatus 10 according to the second exemplary embodiment. If the acquiring unit 38 has acquired the positional information (Y of S180), the first request unit 50 transmits an authentication request using the long-distance communication (S182). If the acquiring unit 38 does not acquire the positional information (N of S180), the second request unit 54 transmits an authentication request using the short-range communication (S184). If the second response unit 56 has received an authentication response containing the authentication code (Y of S186), the first request unit 50 transmits an authentication request (authentication code) using the long-distance communication (S188). If the second response unit 56 does not receive the authentication response containing the authentication code (N of S186), Step S188 is skipped.

Figure 10:
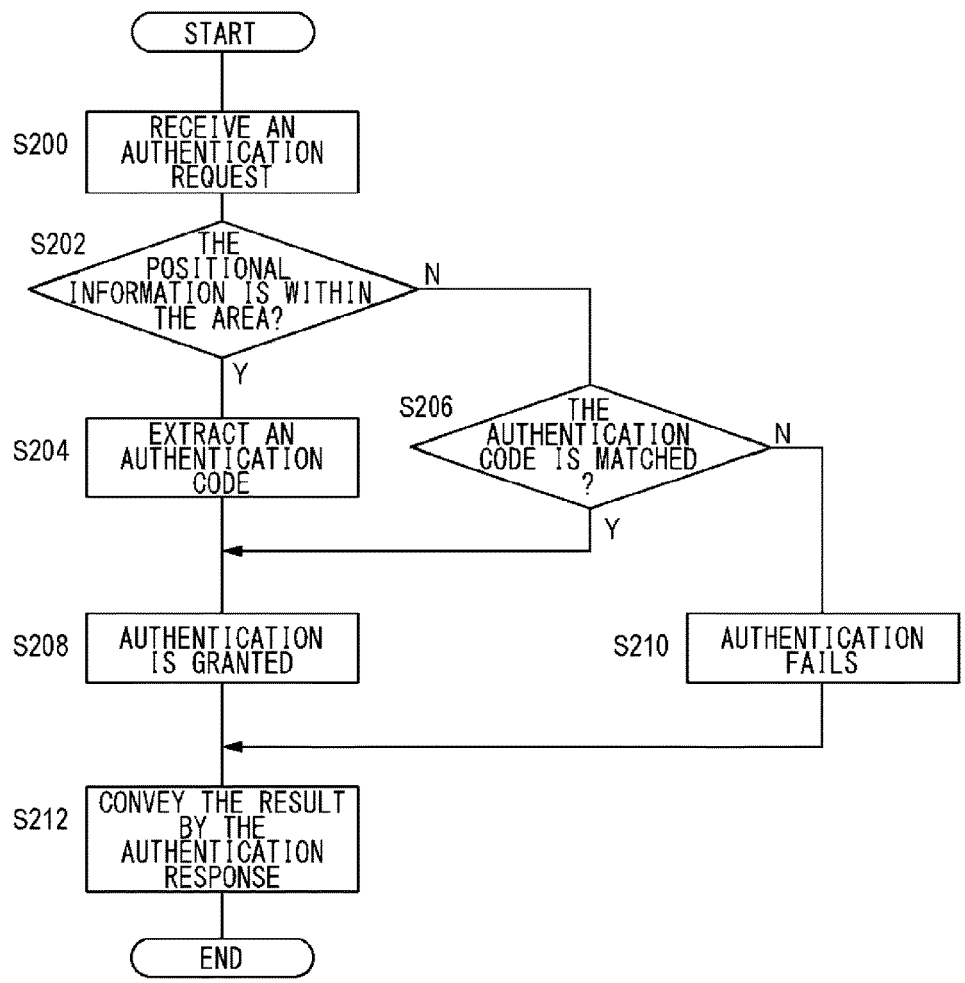
FIG. 10 is a flowchart showing an authentication response procedure carried out by an authentication station according to a second exemplary embodiment.

FIG. 10 is a flowchart showing an authentication response procedure carried out by the authentication station 16 according to the second exemplary embodiment. An authentication request is received (S200). If the positional information is within the area (Y of S202), the authentication code is extracted (S204). If the positional information is not within the area (note here that included is the case where no positional information is contained in the authentication request) (N of S202) and if the authentication codes match (Y of S206), the authentication proves successful (S208). If the authentication codes do not match (note also here that included is the case where no positional information is contained in the authentication request) (N of S206), the authentication is unsuccessful (S210). The authentication station 16 conveys the authentication result by the authentication response (S212).

Figure 11:
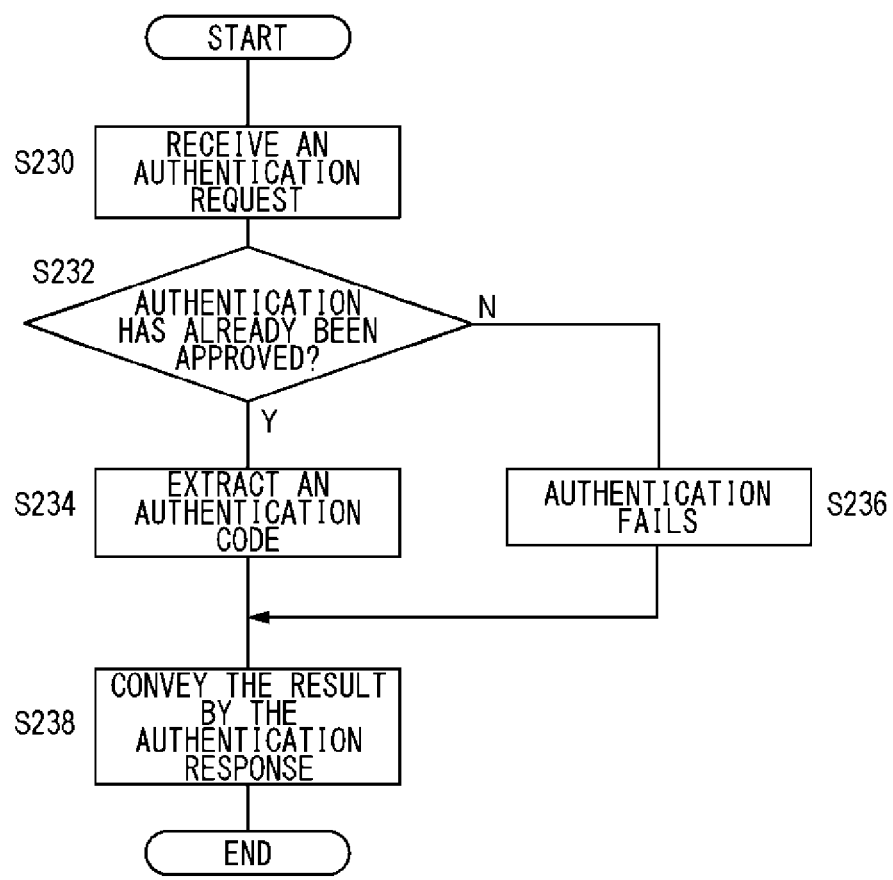
FIG. 11 is a flowchart showing an authentication response procedure carried out by a terminal apparatus according to a second exemplary embodiment.

FIG. 11 is a flowchart showing an authentication response procedure carried out by a terminal apparatus 10 according to the second exemplary embodiment. The receiving unit 58 receives an authentication request (S230). If the authentication has already been approved (Y of S232), the granting unit 60 extracts the authentication code (S234). If the authentication has not been approved (N of S232), the granting unit 60 does not grant authentication (S236). The granting unit 60 conveys the authentication result by an authentication response (S238).

Figure 12:
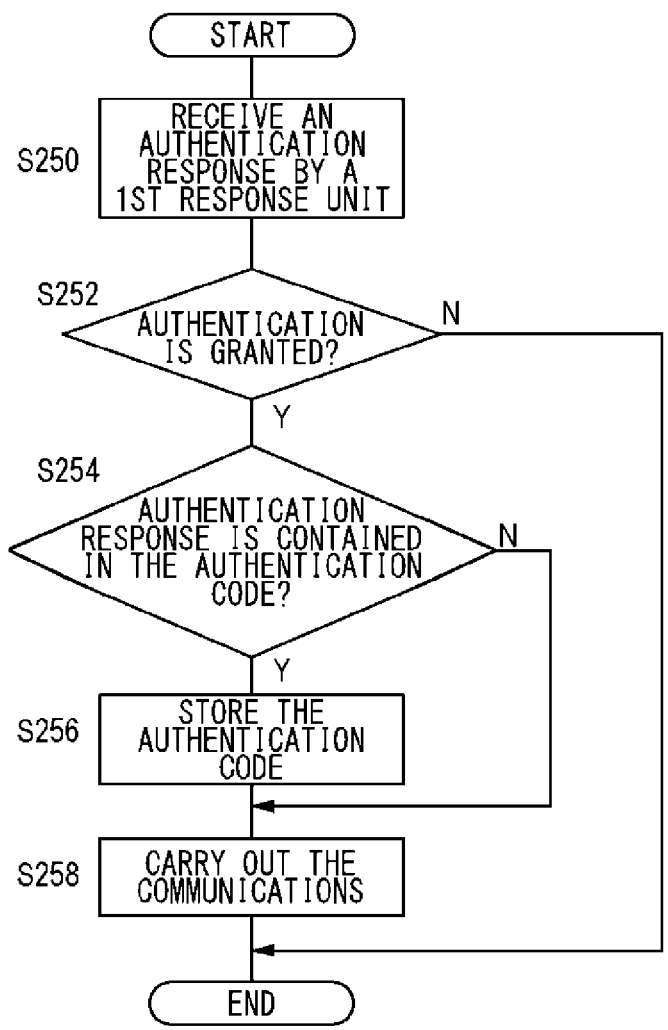
FIG. 12 is a flowchart showing a communication procedure carried out by the terminal apparatus according to a second exemplary embodiment.

FIG. 12 is a flowchart showing a communication procedure carried out by a terminal apparatus 10 according to the second exemplary embodiment. The authentication response is received by the first response unit 52 (S250). If the authentication is granted (Y of S252) and if the authentication code is contained in the authentication response (Y of S254), the storage 40 stores the authentication code (S256). If the authentication code is not contained in the authentication response (N of S254), Step S256 is skipped. The communication processing unit 36 carries out communications (S258). If the authentication is not granted (N of S252), Steps S254 to S258 are skipped.

By employing the second exemplary embodiment, the terminal apparatus transmits the authentication code and then the authentication station performs authentication based on the authentication code, so that the security can be ensured. Also, since the terminal apparatus transmits the authentication code, the user's convenience can be enhanced.

Third Exemplary Embodiment

A description is now given of a third exemplary embodiment. Similar to the first and second exemplary embodiments, the third exemplary embodiment relates also to a communication system in which authentication is performed based on the positional information. In the above-described first and second exemplary embodiments, the authentication request is broadcast to other terminal apparatuses using the short-range communication system if the positional information cannot be acquired. In the third exemplary embodiment, a description is now given of a case where after the positional information is acquired and an authentication request is transmitted to the authentication station, the authentication is not granted by the authentication station. A communication system 100 according to the third exemplary embodiment is of a similar type to that shown in FIG. 2. A description is given herein centering around features different from the first and second exemplary embodiments.

Figure 13:
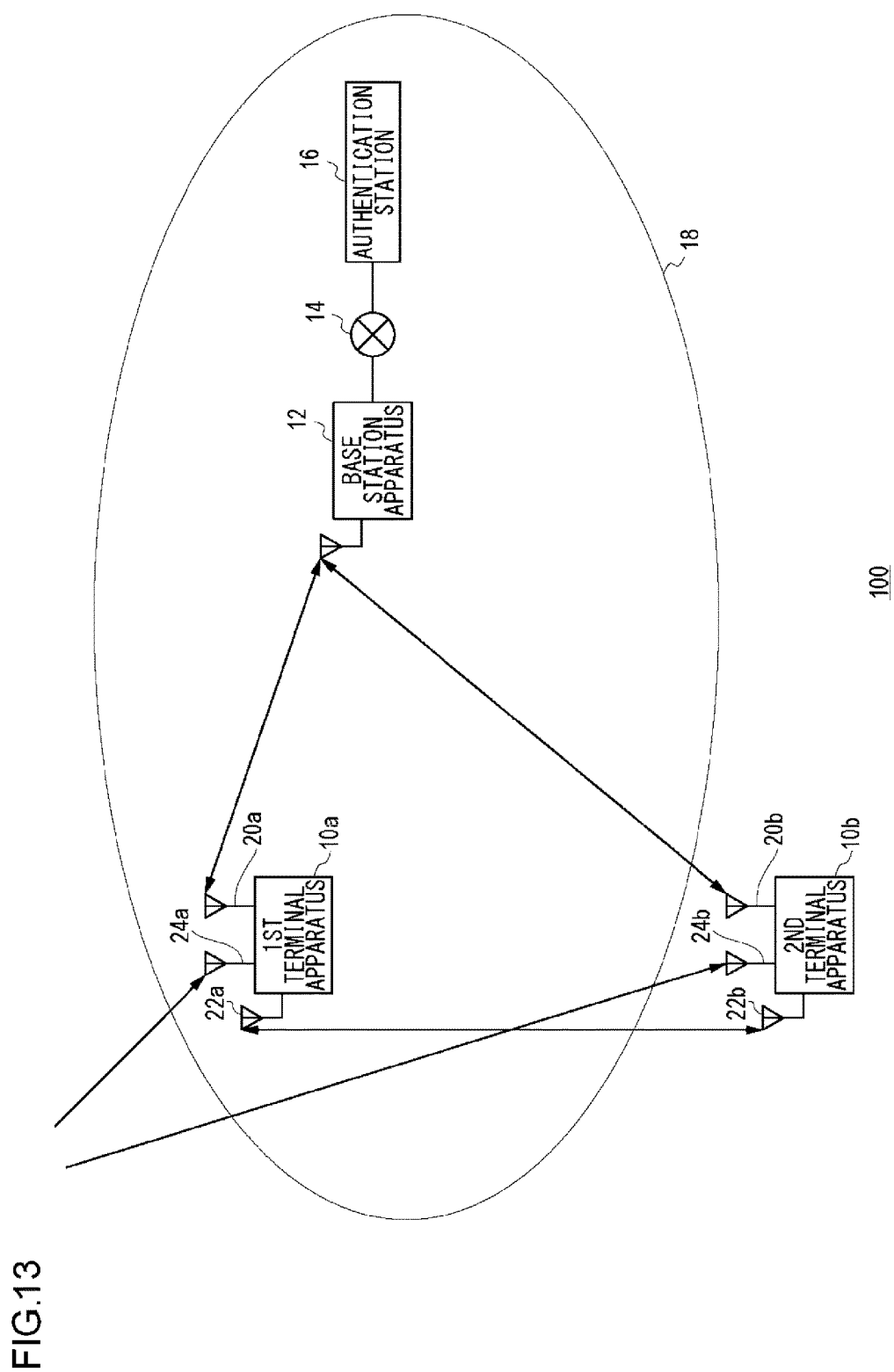
FIG. 13 shows a structure of a communication system according to a third exemplary embodiment.

FIG. 13 shows a structure of a communication system 100 according to the third exemplary embodiment. In comparison with FIG. 1, the second terminal apparatus 10b shown in FIG. 13 is located outside the area 18. The second terminal apparatus 10b receives signals sent from the GPS satellites.

The second terminal apparatus 10b receives the signals sent from the satellites, via the second GPS antenna 24b and thereby acquires the positional information. The second terminal apparatus 10b generates an authentication request signal containing the positional information, and transmits the authentication request signal to the base station apparatus 12 from the second long-distance communication antenna 20b. The authentication station 16 performs authentication processing on the second terminal apparatus 10b, based on the positional information, in response to the authentication request sent from the second terminal apparatus 10b. Since the positional information is not within the area 18, the authentication is not granted for the second terminal apparatus 10b. The authentication station 16 transmits an authentication response signal indicating that the authentication is not granted, to the second terminal apparatus 10b via the network 14 and the base station apparatus 12.

The second terminal apparatus 10b broadcasts the authentication request via the second short-range communication antenna 22b. The first terminal apparatus 10a receives the authentication request from the second terminal apparatus 10b via the first short-range communication antenna 22a. Since the first terminal apparatus 10a has been authenticated by the authentication station 16, the first terminal apparatus 10a acts on behalf of the authentication station 16 and performs authentication processing on the second terminal apparatus 10b. Assume herein that the first terminal apparatus 10a authenticates the second terminal apparatus 10b. The first terminal apparatus 10a transmits an authentication response signal indicating that the authentication has been granted, to the second terminal apparatus 10b via the first short-range communication antenna 22a. The second terminal apparatus 10b carries out communications using the long-distance communication system.

The first response unit 52 of FIG. 2 receives the authentication response from the authentication station 16 and the base station apparatus 12 via the long-distance communication unit 30. If the authentication response indicates that the authentication is not granted, the execution of the subsequent processing is outputted to the second request unit 54. The second request unit 54 generates an authentication request in response to the processing done by the first response unit 52. The second request unit 54 outputs the authentication request to the short-range communication unit 32. Specifically, when the request from the first request unit 50 is not authenticated by the authentication station 16, the second request unit 54 requests another terminal apparatus 10 to perform authentication by using the short-range communication system. The short-range communication unit 32 receives the authentication request fed from the second request unit 54 and then broadcasts the authentication request from the short-range communication antenna 22.

The second response unit 56 receives the authentication response sent from the other terminal apparatus 10, via the short-range communication unit 32. If the authentication response indicates that the authentication is granted, the second response unit 56 instructs the communication processing unit 36 to carry out communications. If the authentication response indicates that the authentication is not granted, the second response unit 56 terminates the processing. If instructions are received from the second response unit 56, the communication processing unit 36 carries out communications using the long-distance communication system, via the long-distance communication unit 30.

The receiving unit 58 and the granting unit 60 carry out processings in the other terminal apparatus 10 that has received the authentication request using the short-range communication system. The receiving unit 58 receives the authentication request sent from the terminal apparatus 10, via the short-range communication unit 32. As the receiving unit 58 receives the authentication request, the granting unit 60 references the storage 40 and thereby verifies whether or not authentication has already been granted by the authentication station 16. If the authentication is granted, the granting unit 60, which now acts on behalf of the authentication station 16, authenticates the terminal apparatus 10. If the authentication is not done, the granting unit 60 does not grant authentication. The granting unit 60 generates an authentication response containing the authentication result, and transmits the authentication response to the terminal apparatus 10 via the short-range communication unit 32.

Figure 14:
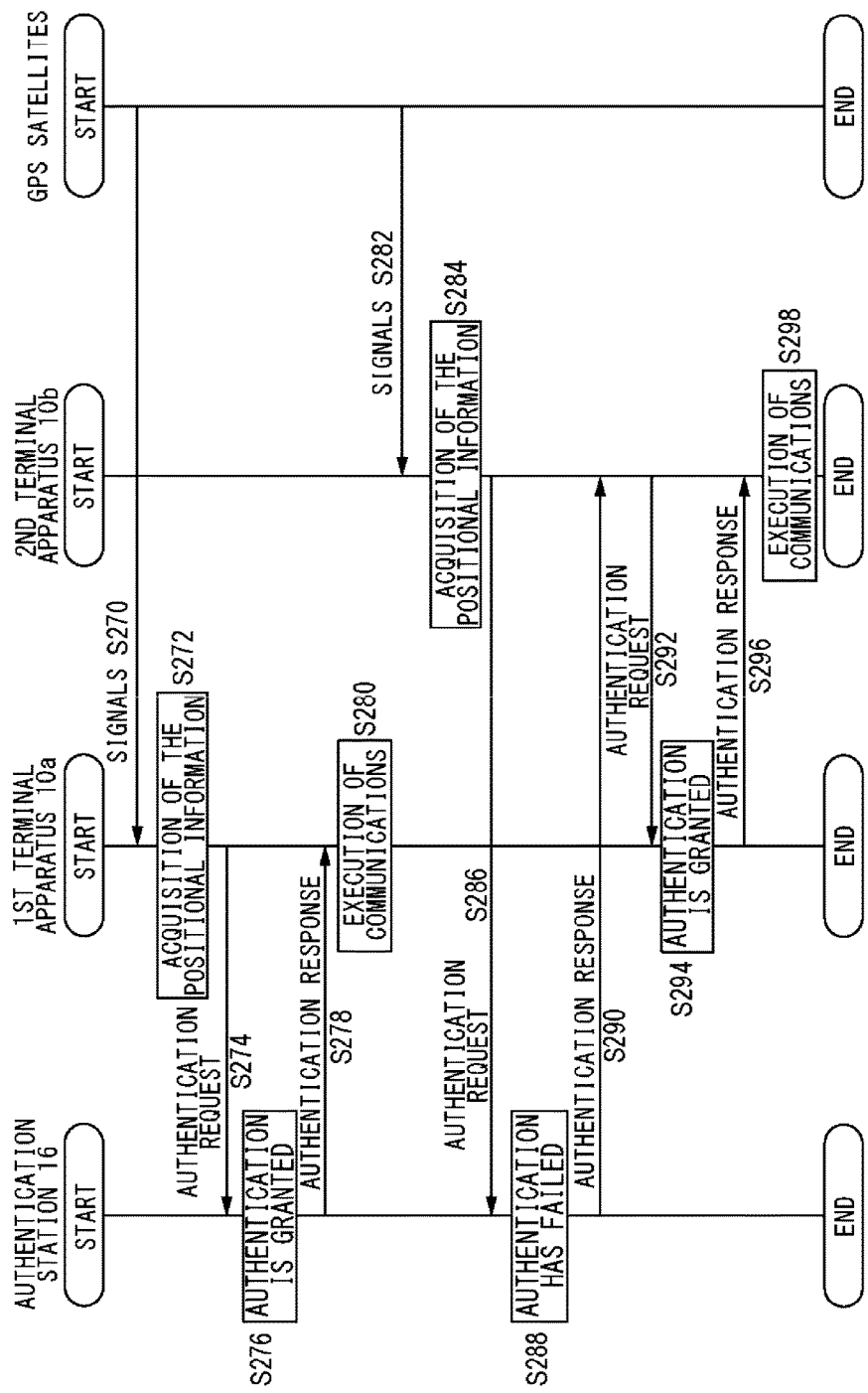
FIG. 14 is a sequence diagram showing a communication procedure carried out by a communication system according to a third exemplary embodiment.

FIG. 14 is a sequence diagram showing a communication procedure carried out by the communication system 100 according to the third exemplary embodiment. Signals sent from the GPS satellites are received by the first terminal apparatus 10a (S270). The first terminal apparatus 10a acquires positional information (S272). The first terminal apparatus 10a transmits an authentication request containing the positional information, to the authentication station 16 (S274). The authentication station 16 determines that the authentication is successful (S276). The authentication station 16 transmits an authentication response indicating that the authentication is successful, to the first terminal apparatus 10a (S278). The first terminal apparatus 10a carries out communications (S280).

Signals sent from the GPS satellites are received by the second terminal apparatus 10b (S282). The second terminal apparatus 10b acquires positional information (S284). The second terminal apparatus 10b transmits an authentication request containing the positional information, to the authentication station 16 (S286). The authentication station 16 determines that the authentication is not successful (S288). The authentication station 16 transmits an authentication response indicating that the authentication is not successful, to the second terminal apparatus 10b (S290). The second terminal apparatus 10b transmits an authentication request to the first terminal apparatus 10a (S292). The first terminal apparatus 10a determines that the authentication is successful (S294). The first terminal apparatus 10a transmits an authentication response indicating that the authentication is successful, to the second terminal apparatus 10b (S296). The second terminal apparatus 10b carries out communications (S298).

Figure 15:
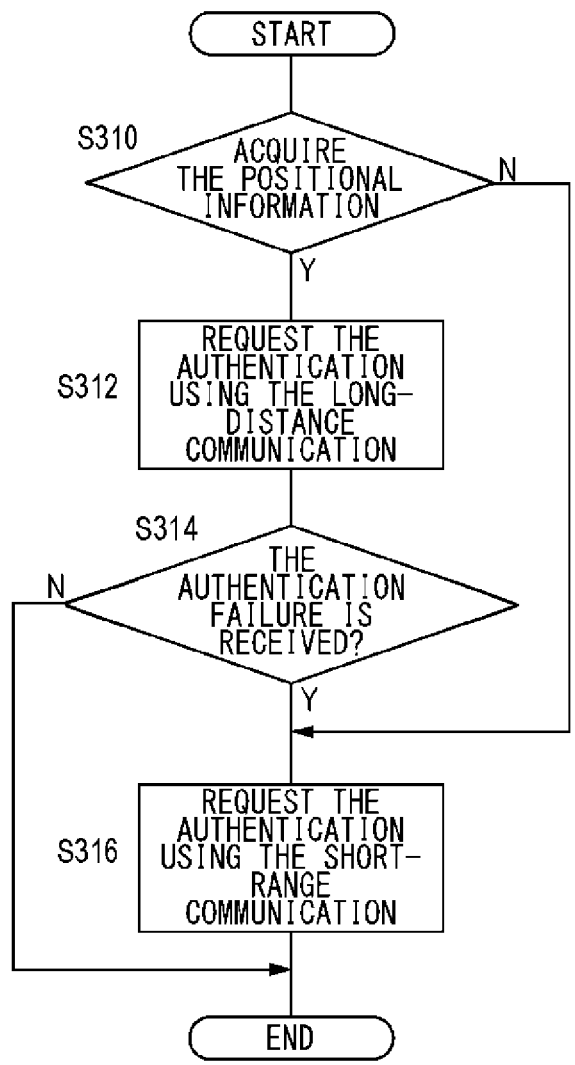
FIG. 15 is a flowchart showing an authentication request procedure carried out by a terminal apparatus according to a third exemplary embodiment.

FIG. 15 is a flowchart showing an authentication request procedure carried out by a terminal apparatus 10 according to the third exemplary embodiment. If the acquiring unit 38 has acquired the positional information (Y of S310), the first request unit 50 transmits an authentication request using the long-distance communication (S312). If the authentication failure is received (Y of S314), the second request unit 54 transmits an authentication request using the short-range communication (S316). If the authentication failure is not received (N of S314), Step S316 is skipped. If the acquiring unit 38 does not acquire the positional information (N of S310), the second request unit 54 transmits an authentication request using the short-range communication (S316).

By employing the third exemplary embodiment, the authentication is not granted for terminal apparatuses not located within the area, so that only terminal apparatuses located within the area can be authenticated. Also, since only the terminal apparatuses located within the area are authenticated, the security can be ensured. Also, even if a terminal apparatus is not located within the area but if it is located at a distance, where the short-range communication is enabled, from another terminal apparatus that has already been authenticated, the authentication is granted. Thus, the security based on this policy can be ensured. Also, since even if the terminal apparatus is not located within the area but located at a short-range communication enabled distance from the other terminal apparatus that has already been authenticated, the authentication is granted, so that the user's convenience can be enhanced.

The present invention has been described based on the exemplary embodiments. The exemplary embodiments are intended to be illustrative only, and it is understood by those skilled in the art that various modifications to constituting elements and processes as well as arbitrary combinations thereof could be developed and that such modifications and combinations are also within the scope.

In the first to third exemplary embodiments, the long-distance communication system is a business-use wireless system. However, this should not be considered as limiting and, for example, the long-distance communication system may be a mobile phone system or the like, instead of the business-use wireless system. In other words, the long-distance communication system may be any communication system as long as the transmission distance is longer than the short-range communication system. By employing this modification, the degree of freedom in configuring the communication system 100, namely the structural flexibility of the communication system 100, can be enhanced.

In the third exemplary embodiment, the second terminal apparatus 10b performs authentication on the first terminal apparatus 10a, as with the first exemplary embodiment. However, this should not be considered as limiting and, for example, the second terminal apparatus 10b may transmit the authentication code, instead, as in the second exemplary embodiment. The subsequent processing may also be carried out similarly to the second exemplary embodiment. By employing this modification, the advantageous effects similar to those of the second exemplary embodiment can be achieved.

What is claimed is:

1. A terminal apparatus comprising:
an acquiring unit that acquires positional information;
a first request unit that selects, when the acquiring unit successfully acquires positional information, a first radio communication system, given the first radio communication system and a second radio communication system whose transmission distance is shorter than the first radio communication system, and that requests an authentication station connected to the terminal apparatus via a base station device to perform authentication by using the first radio communication system and does not request authentication by using the second radio communication system;

a second request unit that selects, when the acquiring unit fails to acquire positional information, the second radio communication system, given the first radio communication system and the second radio communication system whose transmission distance is shorter than the first radio communication system, and that does not request authentication by using the first radio communication system and requests another terminal apparatus different from the authentication station and directly connected to the terminal apparatus without a base station device to perform authentication by using the second radio communication system;

a first response unit that receives an authentication response from the authentication station by using the first radio communication system, when the first request unit requests authentication;

a second response unit that receives an authentication response from said another terminal apparatus by using the second radio communication system, when the second request unit requests authentication;

a communication unit that carries out communication using the first radio communication system when the first response unit receives an authentication response or when the second response unit receives an authentication response.

2. A terminal apparatus according to claim 1, wherein the other terminal, for which authentication has been requested by the second request unit, has already been authenticated by the authentication station, and wherein, when the request from the second request unit is authenticated by the other terminal apparatus, which acts on behalf of the authentication station, the communication unit carries out the communication using the first radio communication system.

3. A terminal apparatus according to claim 1, wherein the other terminal apparatus, for which authentication has been requested by the second request unit, has already been authenticated by the authentication station and has received an authentication code sent from the authentication station, wherein an authentication code sent from the other terminal apparatus is received using the second radio communication system, as a response to the request from the second request unit, wherein the first request unit requests the authentication station to perform authentication by using the authentication code in substitution for the positional information, and wherein, when the request from the first request unit is authenticated by the authentication station, the communication unit carries out the communication using the first radio communication system.

4. A communication system comprising:

a first terminal apparatus that requests authentication using acquired positional information;

an authentication station that permits the first terminal apparatus to carry out communication using a first radio communication system, in response to a request sent from the first terminal apparatus, when the first terminal apparatus has been authenticated based on the positional information; and a second terminal apparatus for which the communication using the first radio communication system is not authenticated, wherein the second terminal apparatus includes:

an acquiring unit that acquires positional information;

a first request unit that selects, when the acquiring unit successfully acquires positional information, a first radio communication system, given the first radio communication system and a second radio communication system whose transmission distance is shorter than the first radio communication system, and that requests an authentication station connected to the second terminal apparatus to perform authentication by using the first radio communication system and does not request authentication by using the second radio communication system;

a second request unit that selects, when the acquiring unit fails to acquire positional information, the second radio communication system, given the first radio communication system and the second radio communication system whose transmission distance is shorter than the first radio communication system, and that does not request authentication by using the first radio communication system and requests the first terminal apparatus different from the authentication station and directly connected to the second terminal apparatus without a base station device to perform authentication by using the second radio communication system;

a first response unit that receives an authentication response from the authentication station by using the first radio communication system, when the first request unit requests authentication;

a second response unit that receives an authentication response from the first terminal apparatus by using the second radio communication system, when the second request unit requests authentication; and a communication unit that carries out communication using the first radio communication system when the first response unit receives an authentication response or when the second response unit receives an authentication response.

5. A communication method comprising:

acquiring positional information;

selecting, when acquisition of positional information is successful, a first radio communication system, given the first radio communication system and a second radio communication system whose transmission distance is shorter than the first radio communication system, and that requests an authentication station connected via a base station device to perform authentication by using the first radio communication system and not requesting authentication by using the second radio communication system;

selecting, when acquisition of positional information fails, and not requesting authentication by using the first radio communication system and requesting another terminal apparatus different from the authentication station and directly connected to the terminal apparatus without a base station device to perform authentication by using the second radio communication system;

receiving an authentication response from the authentication station by using the first radio communication system, when authentication is requested by using the first radio communication system;

receiving an authentication response from said another terminal apparatus by using the second radio communication system, when authentication is requested by using the second radio communication system; and carrying out communication using the first radio communication system when an authentication response is received from the authentication station by using the first radio communication system or when an authentication response is received from said another terminal apparatus by using the second radio communication system.

6. A communication method comprising:

requesting, using a first terminal apparatus, authentication using acquired positional information;

permitting, using an authentication station, the first terminal apparatus to carry out communication using a first radio communication system, in response to a request sent from the first terminal apparatus, when the first terminal apparatus has been authenticated based on the positional information;

acquiring, using a second terminal apparatus, positional information when authentication required for carrying out the communication using the first radio communication system is not performed;

selecting, using the second terminal apparatus when acquisition of positional information is successful, a first radio communication system, given the first radio communication system and a second radio communication system whose transmission distance is shorter than the first radio communication system, and requesting an authentication station connected via a base station device to perform authentication by using the first radio communication system and not requesting authentication by using the second radio communication system;

selecting, using the second terminal apparatus when acquisition of positional information fails, the second radio communication system, given the first radio communication system and the second radio communication system whose transmission distance is shorter than the first radio communication system, and not requesting authentication by using the first radio communication system and requesting the first terminal apparatus different from the authentication station and directly connected to the second terminal apparatus without a base station device to perform authentication by using the second radio communication system;

receiving, using the second terminal apparatus, an authentication response from the authentication station by using the first radio communication system, when authentication is requested by using the first radio communication system;

receiving, using the second terminal apparatus, an authentication response from the first terminal apparatus by using the second radio communication system, when authentication is requested by using the second radio communication system; and carrying out, using the second terminal apparatus, communication using the first radio communication system when an authentication response is received from the authentication station by using the first radio communication system or when an authentication response is received from the first terminal apparatus by using the second radio communication system.

* * * * *